(12) United States Patent
Liu et al.

(10) Patent No.: US 8,366,062 B2
(45) Date of Patent: Feb. 5, 2013

(54) TRIPOD HEAD WITH FOLDING HANDLE

(75) Inventors: Hao Liu, Zhongshan (CN); Robert M. Rose, Woodcliff Lake, NJ (US)

(73) Assignee: Mamiya America Corporation, North White Plains, NY (US)

( * ) Notice: Subject to any disclaimer, the term of this patent is extended or adjusted under 35 U.S.C. 154(b) by 344 days.

(21) Appl. No.: 12/709,012

(22) Filed: Feb. 19, 2010

(65) Prior Publication Data
US 2011/0108685 A1 May 12, 2011

(30) Foreign Application Priority Data
Nov. 6, 2009 (CN) .......................... 2009 2 0262478

(51) Int. Cl.
*F16M 11/02* (2006.01)
(52) U.S. Cl. ............... 248/178.1; 248/177.1; 248/187.1; 248/165; 396/419; 396/428; 16/430
(58) Field of Classification Search ............... 248/178.1, 248/177.1, 161, 158, 187.1, 163.1, 165, 166, 248/434; 224/908, 584; 396/419, 428; 352/243; 16/430, 436, 438, 352
See application file for complete search history.

(56) References Cited

U.S. PATENT DOCUMENTS

| | | | | |
|---|---|---|---|---|
| 4,249,817 | A | | 2/1981 | Blau |
| 5,839,704 | A | * | 11/1998 | Appleman .................. 248/178.1 |
| 6,401,301 | B1 | * | 6/2002 | Hung .............................. 16/430 |
| 6,729,778 | B1 | * | 5/2004 | Wu et al. ...................... 396/428 |
| 7,047,846 | B1 | * | 5/2006 | Hu ................................. 81/177.7 |
| D629,828 | S | * | 12/2010 | Guidolin ..................... D16/245 |
| 2002/0179787 | A1 | | 12/2002 | Nakatani |
| 2003/0147641 | A1 | | 8/2003 | Haney |
| 2004/0061035 | A1 | | 4/2004 | Nakatani |
| 2004/0155159 | A1 | * | 8/2004 | Tiffen et al. ............... 248/177.1 |
| 2004/0195473 | A1 | * | 10/2004 | Ma .............................. 248/177.1 |
| 2011/0006170 | A1 | * | 1/2011 | Liu et al. ....................... 248/121 |

OTHER PUBLICATIONS

International Search Report issued in a counterpart International Application PCT/US2010/053926, US International Searching Authority, Aug. 18, 2011.

* cited by examiner

*Primary Examiner* — Todd M Epps
(74) *Attorney, Agent, or Firm* — Gottlieb, Rackman & Reisman, PC

(57) ABSTRACT

A tripod head comprises a mount and an angle adjustment mechanism for adjusting and locking the angle of the mount with respect to a tripod. The mechanism comprises an elongated handle. The handle is adapted to rotate around its longitudinal axis to lock the angle of the mechanism when rotated in one direction and unlock the angle of the mechanism when rotated in the other direction. The handle comprises a proximal portion and a distal portion. The distal portion is attached at a pivot point whereby the distal portion can pivot between an operative position in line with the proximal portion and a storage position generally perpendicular to the proximal portion. The handle further comprises a locking device for releasably locking the distal portion in the operative position.

17 Claims, 10 Drawing Sheets

(PRIOR ART)

FIGURE 13

(PRIOR ART)

TRIPOD HEAD WITH FOLDING HANDLE

The present application claims priority to Chinese Patent Application No. 200920262478.6, filed Nov. 6, 2009, the entirety of which is hereby incorporated by reference. The subject matter of the present application is relevant to that of U.S. patent application Ser. No. 12/708,989 to Liu et al., filed on the same date as this disclosure, entitled "Multi-Axis Photographic Tripod Heads," the entirety of which is hereby incorporated by reference.

FIELD

The present disclosure relates to support devices, and in particular to tripod heads.

BACKGROUND

Figure 12:
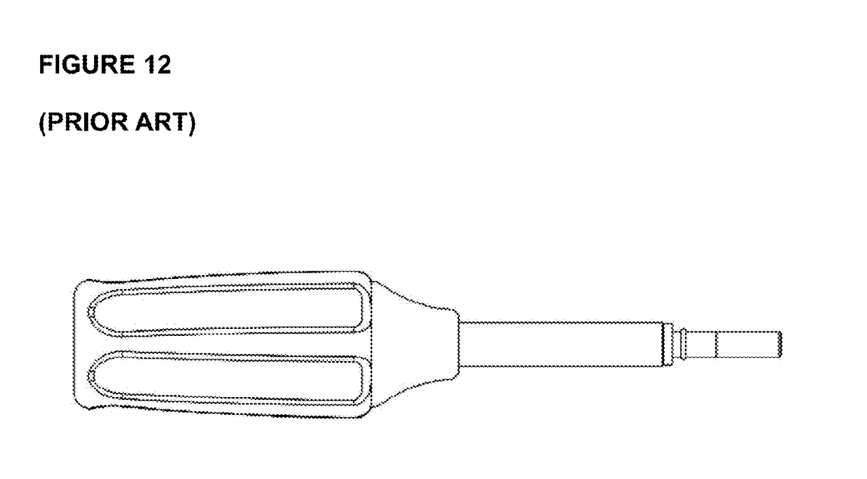
FIG. 12 is a side view of a non-folding handle in the prior art.
Figure 13:
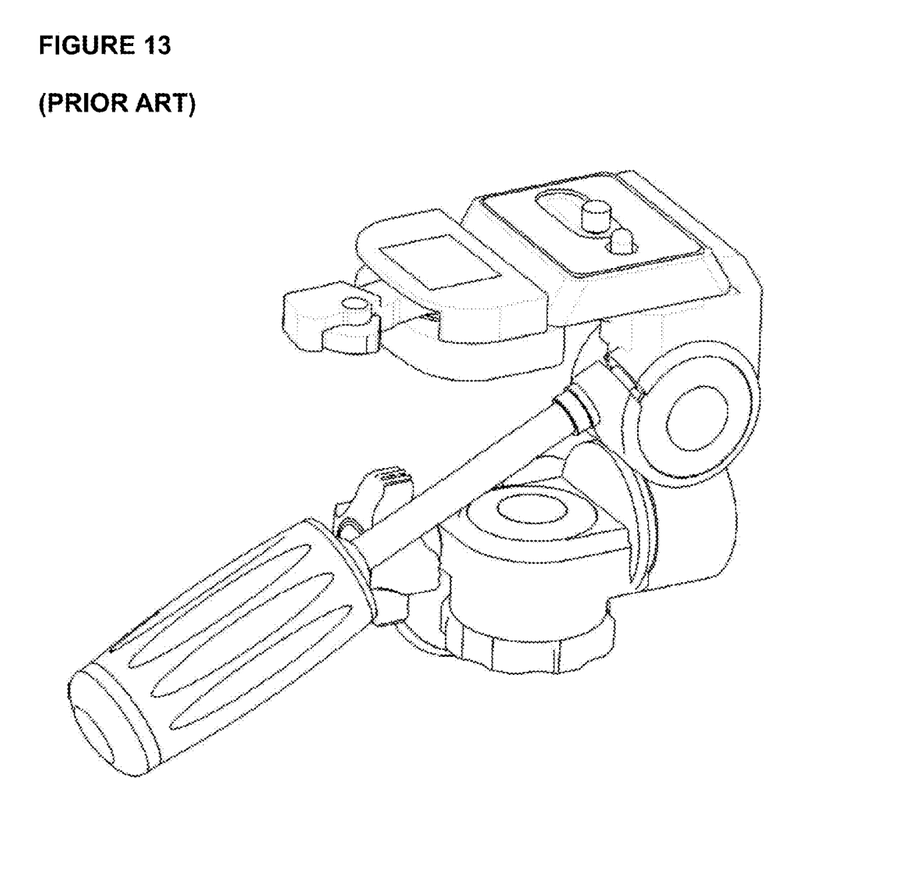
FIG. 13 is a side view of a tripod head in the prior art.

As shown in FIGS. 12 and 13, conventional tripod heads often include handles for adjusting and locking tripod heads. Typically, these handles comprise a single shaft. These handles usually protrude from the main body of the tripod head, which may cause packing and transport cumbersome and difficult. For example, the bags or cases for the tripod and head may need to have an enlarged space to receive the adjustment handles. Further, the typical handle may be difficult to adjust in a small space.

BRIEF SUMMARY

In one aspect, a tripod head comprises a mount and an angle adjustment mechanism for adjusting and locking the angle of the mount with respect to a tripod. The mechanism comprises an elongated handle. The handle is adapted to rotate around its longitudinal axis to lock the angle of the mechanism when rotated in one direction and unlock the angle of the mechanism when rotated in the other direction. The handle comprises a proximal portion and a distal portion. The distal portion is attached at a pivot point whereby the distal portion can pivot between an operative position in line with the proximal portion and a storage position generally perpendicular to the proximal portion. The handle further comprises a locking device for releasably locking the distal portion in the operative position.

DETAILED DESCRIPTION OF THE PREFERRED EMBODIMENTS

Referring to FIGS. 1 to 7, according to one embodiment, a handle 1 comprises a proximal portion 11, a distal portion 12, and a sleeve 2. The sleeve 2 can releasably lock the distal portion in an operative position. Alternatively, any suitable locking device can be used, such as a sleeve 2, a latch or a magnetic lock. Preferably, a sleeve, as shown at 2, is used.

The distal portion 12 is attached to the proximal portion 11 at a pivot point 113. The distal portion 12 can pivot between an operative position in line with the proximal portion 11 and a storage position generally perpendicular to the proximal portion 11. The phrase "generally perpendicular" means perpendicular or at least substantially perpendicular. Preferably the angle between the proximal portion and the distal portion in the storage position is 90°±20°.

Referring to FIGS. 1 to 7, the distal end 111 of the proximal portion 11 preferably comprises an elongated slot 112. The slot 112 extends parallel to the longitudinal axis of the proximal portion 11. The distal end 111 comprises an opening 113. The proximal end 121 of the distal portion 12 comprises an opening 122. The proximal end 121 of the distal portion 12 is adapted to insert into the slot 112. When the proximal end 121 is inserted into the slot 112, the opening 113 and the opening 122 are aligned.

Referring to FIGS. 1 to 7, the distal portion 12 comprises a pin 13. The pin 13 is adapted to match the openings 113 and 122. The pin 13 connects the proximal portion 11 and the distal portion 12 together, and allows the distal portion 12 pivot between the operative and storage positions.

Figure 1:
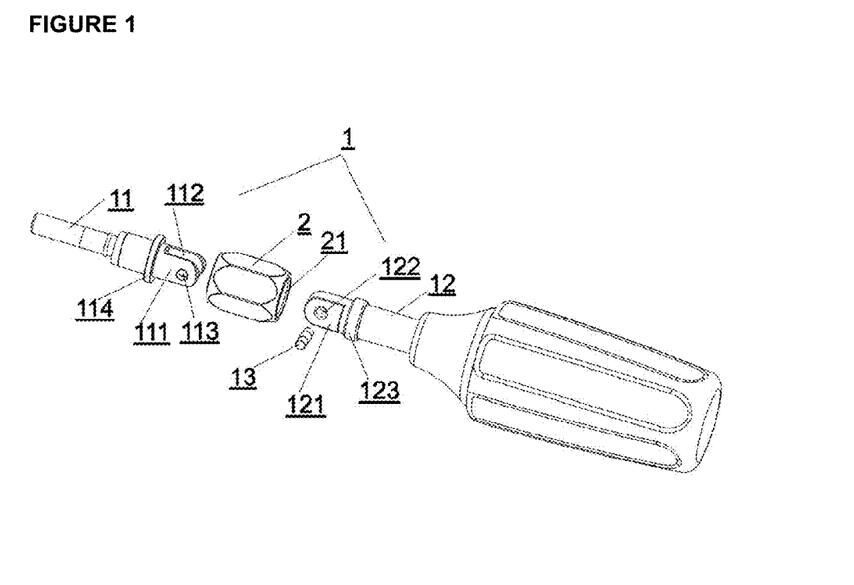
FIG. 1 is an exploded view of a handle according to one embodiment.
Figure 2:
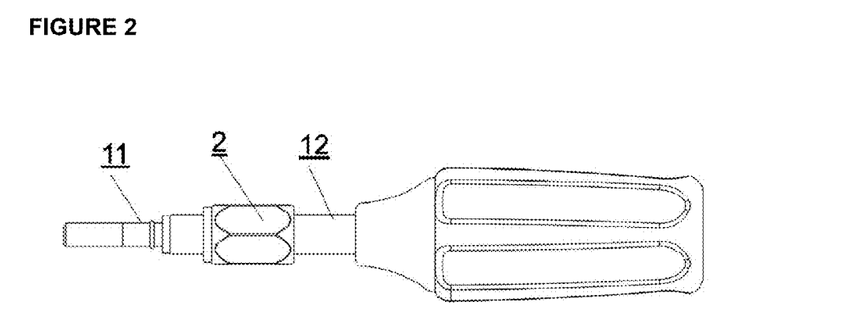
FIG. 2 is a side view of a handle in an operative position according to one embodiment.

With reference to FIG. 2, preferably, the distal portion 12 includes a large knob 900 that is easy to hold and manipulate with one's hand.

Referring to FIGS. 1 to 7, the sleeve 2 is adapted to surround the parts of the proximal portion 11 and the distal portion 12 closest to the pivot point 113 when locking the distal portion 12 in the operative position. The sleeve 2 is also adapted to be slid to a released position on one side or the other of the pivot point 113. Preferably, the released position is distal to the pivot point. The sleeve 2 comprises internal threads 21 adapted to mate with threads 123 on the distal portion 12 of the handle 1 to thereby securing the sleeve 2 in its locking position. Accordingly, the internal threads 21 are on the distal end of the sleeve 2. Alternatively, the internal threads 21 can be on the proximal end of the sleeve 2 and mate with threads on the proximal portion 11. The released position is proximal to the pivot point 113. Preferably, the proximal portion 11 comprises a flange 114 to prevent the sleeve 2 from sliding further toward the proximate portion 11.

Figure 5:
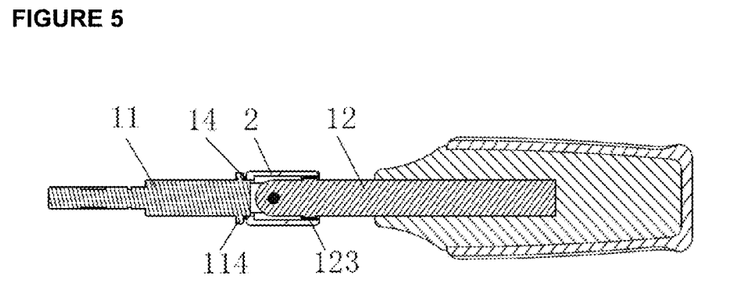
FIG. 5 is a longitudinal sectional view of the handle of FIG. 2.
Figure 6:
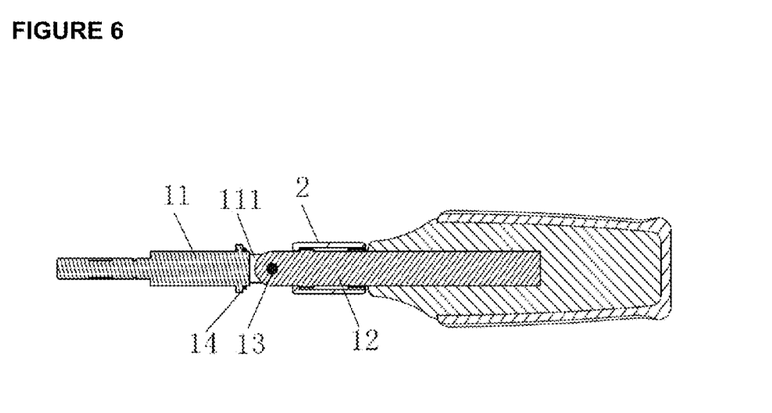
FIG. 6 is a longitudinal sectional view of the handle of FIG. 3.
Figure 7:
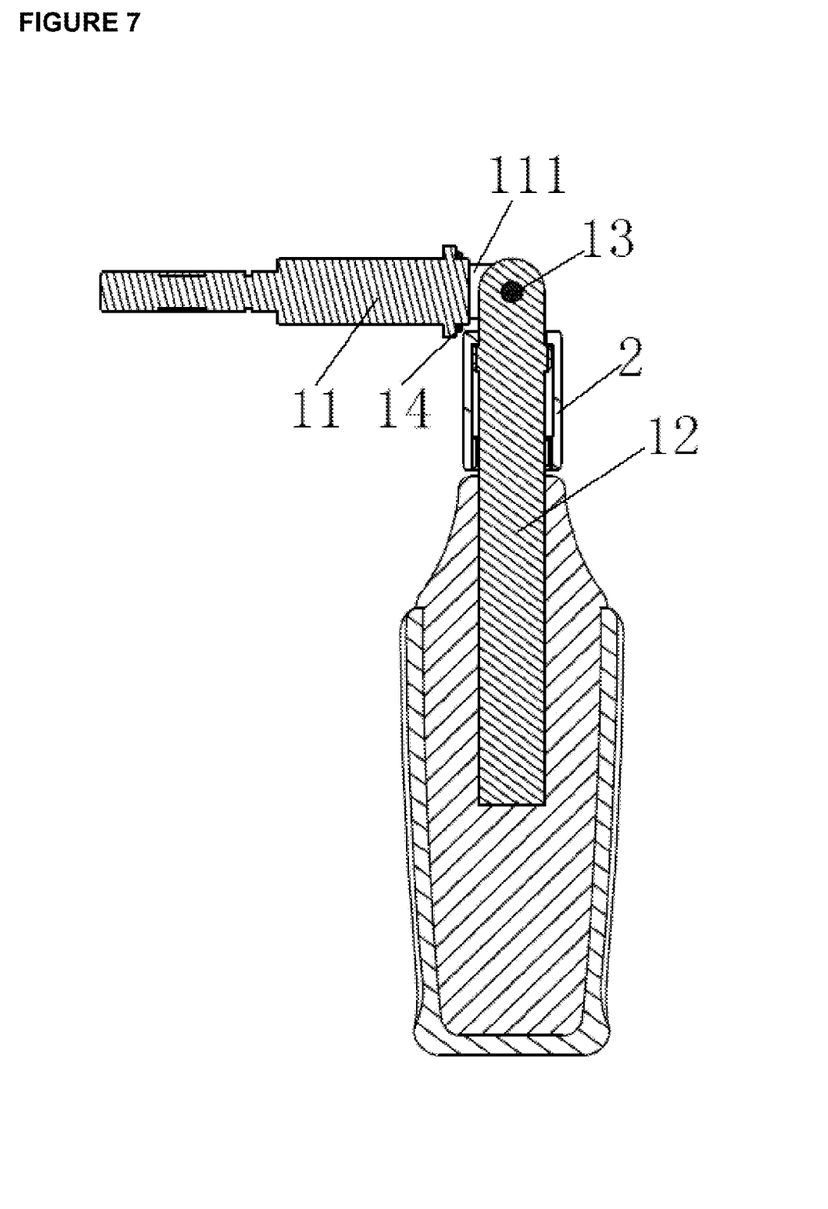
FIG. 7 is a longitudinal sectional view of the handle of FIG. 4 in a storage position.

Preferably, the handle further comprises a component that secures the sleeve 2 on the proximal portion 11 when the handle is in the operative position. The component can be any suitable structure. Referring to FIGS. 5-7, preferably, the component is an O-ring 14. When the sleeve 2 is in its locking position, the O-ring 14 is compressed between the sleeve 2 and the flange 114. As such, the O-ring prevents the sleeve from unscrewing on its own, to further secure the sleeve in the proximal portion 11 when the handle is in the operative position.

Preferably, the sleeve 2 further comprises a spring or other means to bias the sleeve toward the distal portion. In this way, when the sleeve 2 is unscrewed from its locking position, it is automatically moved out of the way so that the handle can be folded.

Referring to FIGS. 2 and 5, when the sleeve 2 surrounds the parts of the proximal portion 11 and the distal portion 12 closest to the pivot point 112, the distal portion 12 is locked in the operative position.

Figure 3:
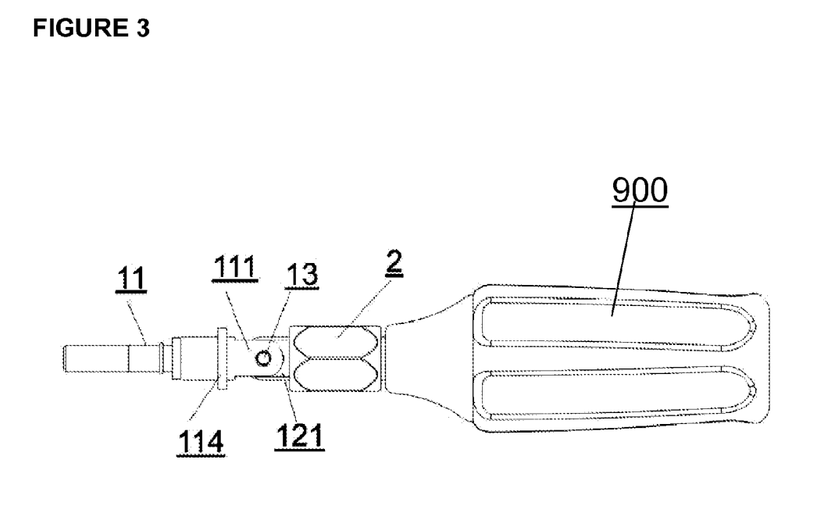
FIG. 3 is a side view of a handle in an unlocked position according to one embodiment.
Figure 4:
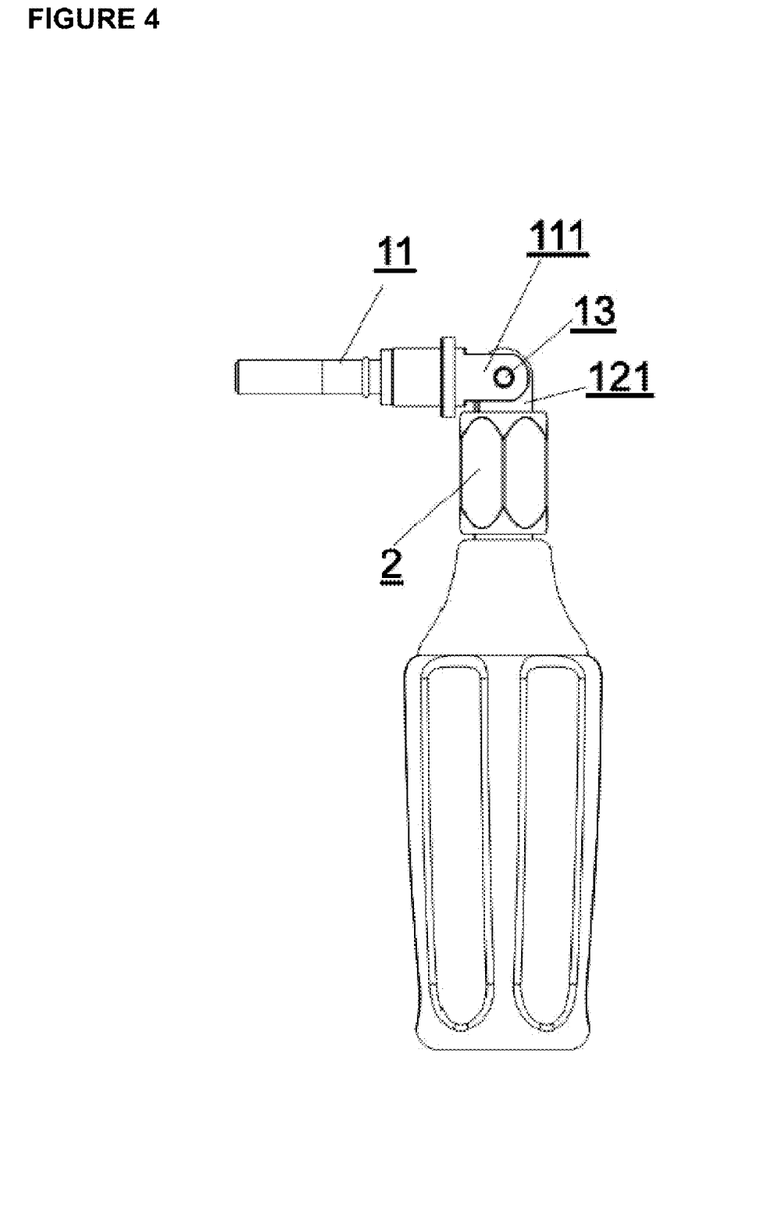
FIG. 4 is a side view of a handle in a storage position according to one embodiment.
Figure 9:
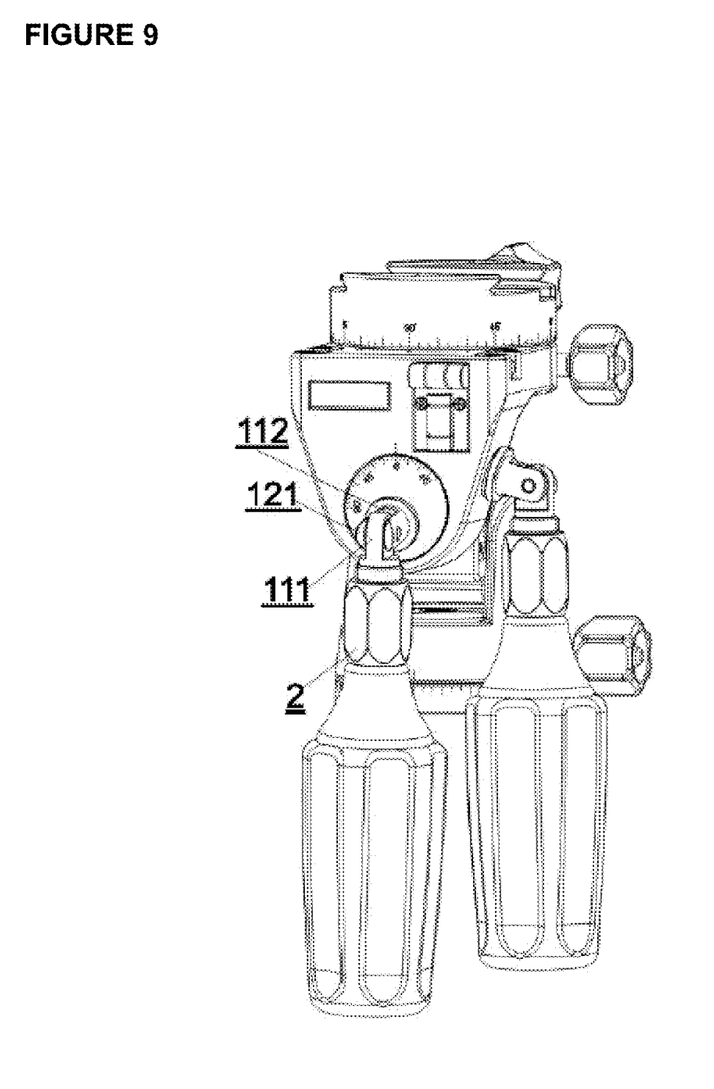
FIG. 9 is a side view of a tripod head in a storage condition according to one embodiment.
Figure 10:
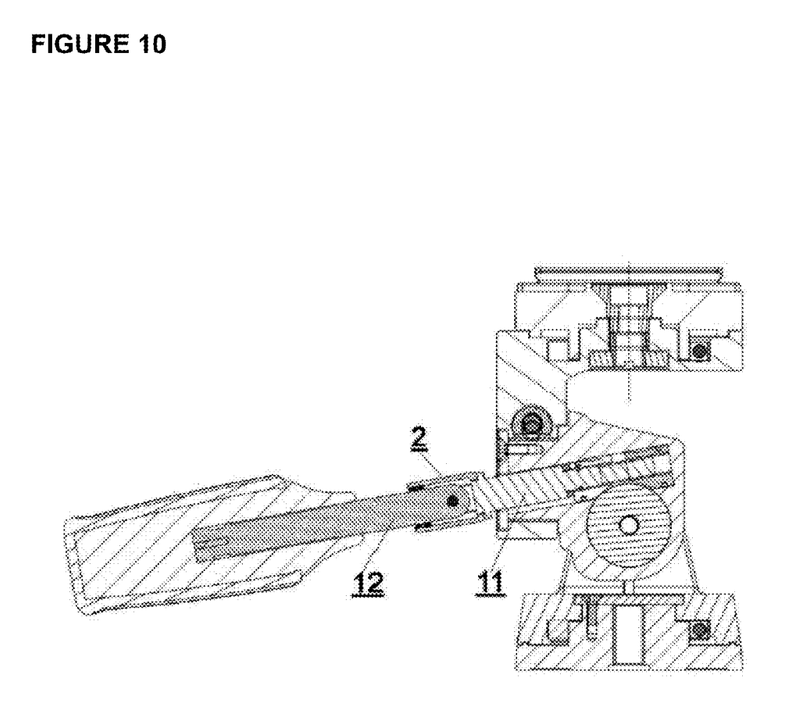
FIG. 10 is a longitudinal sectional view of the tripod head of FIG. 8.
Figure 11:
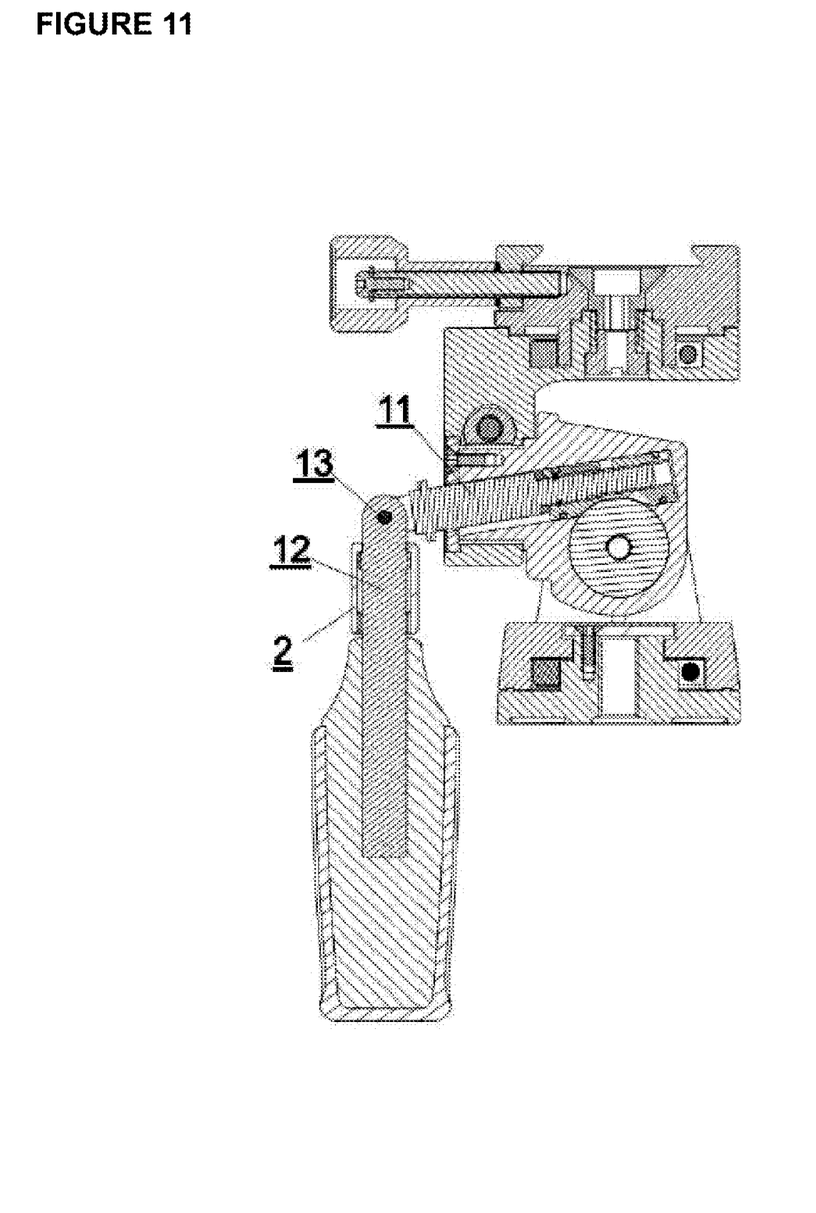
FIG. 11 is a longitudinal sectional view of the tripod head of FIG. 9.

Referring to FIG. 3 and FIG. 6, the sleeve 2 is in the released position distal to the pivot point. The distal end 111 of the proximal portion 11 and the proximal end 121 of the distal portion 12 are exposed. The distal portion 12 can pivot to the storage position, as shown in FIGS. 4, 7, and 9. To return to the operative position, the distal portion 12 pivots to be in line with the proximate portion 11. Then the sleeve 2 slides along the distal portion 12 until it surrounds the parts of the proximal and distal portions closest to the pivot point 113 and is stopped by the flange 14. The handle 1 thus is in the operative position.

Referring to FIGS. 8-11, in the preferred embodiment, the tripod head comprises two elongated handles.

Figure 8:
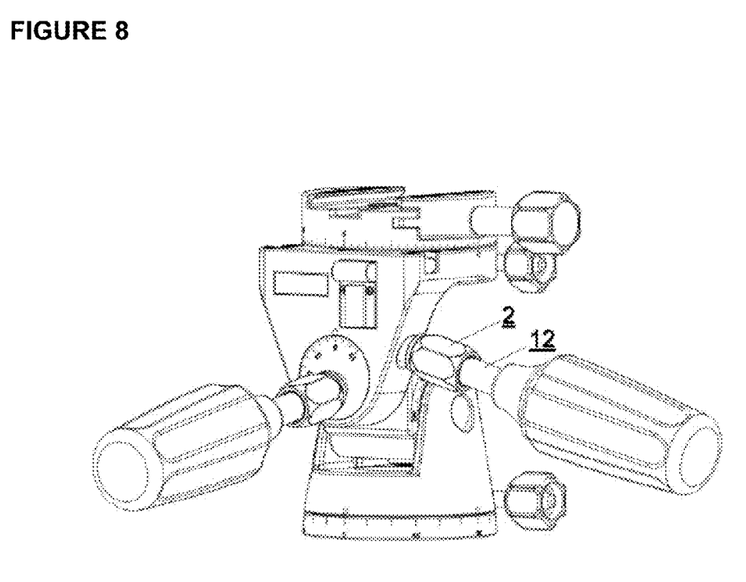
FIG. 8 is a side view of a tripod head in an operative condition according to one embodiment.

Referring to FIGS. 8 and 9, the distal portion 12 is closer to the main body of the tripod head in the storage position than in the operative position. The tripod with the folded handle may be fit in a much smaller space, convenient to packing and transport.

Many modifications and other embodiments of the present disclosure will come to mind to one skilled in the art to which the present disclosure pertains having the benefit of the teachings presented in the foregoing description. It will be apparent to those skilled in the art that variations and modifications of the present disclosure can be made without departing from the scope or spirit of the present disclosure. Therefore, it is to be understood that the invention is not limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A tripod head comprising:
   a mount;
   an angle adjustment mechanism for adjusting and locking the angle of the mount with respect to a tripod, the mechanism comprising an elongated handle, the handle adapted to rotate around its longitudinal axis to lock the angle of the mechanism when rotated in one direction and unlock the angle of the mechanism when rotated in the other direction;
   wherein the handle comprises a proximal portion and a distal portion, and wherein the distal portion is attached at a pivot point whereby the distal portion can pivot between an operative position in line with the proximal portion and a storage position generally perpendicular to the distal portion; and
   wherein the handle further comprises a locking device for releasably locking the distal portion in the operative position and comprises a sleeve adapted to enclose parts of the proximal and distal portions closest to the pivot point when locking the distal portion in the operative position, and wherein said sleeve is comprised of internal threads on its distal end.

2. The invention of claim 1, wherein the locking device further comprises an O-ring to secure the sleeve in the proximal portion when the handle is in the operative position.

3. The invention of claim 1, wherein the distal portion of the handle comprises a knob.

4. The tripod head of claim 1, wherein the angle adjustment mechanism further comprises a second elongated handle, wherein the second handle comprises a proximal portion and a distal portion, and wherein the distal portion is attached at a pivot point whereby the distal portion can be folded between an operative position in line with the proximal portion and a storage position generally perpendicular to the proximal portion; and wherein the second handle further comprises a locking device for releasably locking the distal portion in the operative position.

5. The invention of claim 1, wherein the sleeve is adapted to be slid to a released position on one side or the other of the pivot point.

6. The invention of claim 5, wherein the released position is distal to the pivot point.

7. The invention of claim 5, wherein the locking device comprises internal threads adapted to mate with threads on either the proximal or the distal portion of the handle to thereby secure the locking device in its locking position.

8. The invention of claim 7, wherein the internal threads are on the proximal end of the sleeve and mate with threads on the proximal portion of the handle.

9. The invention of claim 8, further comprising a spring to bias the sleeve toward the distal portion.

10. A tripod head comprising:
    a mount for a camera;
    an angle adjustment mechanism for adjusting and locking the angle of the mount with respect to a tripod, the mechanism comprising an elongated handle, the handle adapted to rotate around its longitudinal axis to lock the angle of the mechanism when rotated in one direction and unlock the angle of the mechanism when rotated in the other direction;
    wherein the handle comprises a proximal portion and a distal portion, and wherein the distal portion includes a knob and is attached to the proximal portion at a pivot point whereby the distal portion can pivot between an operative position in line with the proximal portion and a storage position generally perpendicular to the proximal portion; and
    wherein the handle further comprises a locking sleeve for releasably locking the distal portion in the operative position, the sleeve adapted to slide between a locking position over the parts of the proximal and distal portions closest to the pivot point and a released position where the sleeve is distal to the pivot point, and said sleeve comprising internal threads on its distal end.

11. The invention of claim 10, wherein the locking device further comprises an O-ring to secure the sleeve in the proximal portion when the handle is in the operative position.

12. The tripod head of claim 10, wherein the angle adjustment mechanism further comprises a second elongated handle, wherein the second handle comprises a proximal portion and a distal portion, and wherein the distal portion is attached at a pivot point whereby the distal portion can be folded between an operative position in line with the proximal portion and a storage position generally perpendicular to the proximal portion; and wherein the second handle further comprises a locking device for releasably locking the distal portion in the operative position.

13. The invention of claim 10, wherein the sleeve is adapted to be slid to a released position on one side or the other of the pivot point.

14. The invention of claim 13, wherein the released position is distal to the pivot point.

15. The invention of claim 13, wherein the locking device comprises internal threads adapted to mate with threads on either the proximal or the distal portion of the handle to thereby secure the locking device in its locking position.

16. The invention of claim 15, wherein the internal threads are on the proximal end of the sleeve and mate with threads on the proximal portion of the handle.

17. The invention of claim 16, further comprising a spring to bias the sleeve toward the distal portion.

* * * * *